(12) United States Patent
Perrin et al.

(10) Patent No.: US 12,392,234 B2
(45) Date of Patent: Aug. 19, 2025

(54) MODULAR BOREHOLE IMAGING APPARATUS AND METHODS

(71) Applicant: Schlumberger Technology Corporation, Sugar Land, TX (US)

(72) Inventors: Cédric Perrin, Clamart (FR); Jose Luis Lopes, Clamart (FR); Sébastien Jacquart, Clamart (FR); Miguel Delgado, Clamart (FR); Florian Becker, Clamart (FR); Pedro Alexandre Das Neves, Clamart (FR); Ram Sunder Kalyanraman, Richmond, TX (US); Syed Talghani, Katy, TX (US); Alexis He, Clamart (FR); Chew Yeong Leong, Tananger (NO); Josselin Kherroubi, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/154,069

(22) Filed: Jan. 13, 2023

(65) Prior Publication Data
US 2023/0220762 A1   Jul. 13, 2023

Related U.S. Application Data

(63) Continuation of application No. 17/247,268, filed on Dec. 7, 2020, now Pat. No. 11,555,395.

(30) Foreign Application Priority Data

Dec. 12, 2019   (EP) .................................... 19306641

(51) Int. Cl.
*E21B 47/002* (2012.01)
*E21B 47/01* (2012.01)
(Continued)

(52) U.S. Cl.
CPC .......... *E21B 47/0025* (2020.05); *E21B 47/01* (2013.01); *E21B 47/08* (2013.01); *G01V 1/40* (2013.01)

(58) Field of Classification Search
CPC .... E21B 47/0025; E21B 47/002; E21B 47/08; G01V 1/40; G01V 11/005; G01B 7/13; G01B 7/287
See application file for complete search history.

(56) References Cited

U.S. PATENT DOCUMENTS 2,719,363 A * 10/1955 Montgomery .......... E21B 47/08
                                                175/321
2,771,686 A * 11/1956 Hamontre ............... E21B 47/08
                                                33/544.3

(Continued)

FOREIGN PATENT DOCUMENTS

CN          2139626 Y      8/1993
CN       101434053 A       5/2009
(Continued)

OTHER PUBLICATIONS

Brochure: Gyrodata, http://www.gyrodata.com/services/logging-services/multi-finger-caliper-logging/—downloaded on Dec. 1, 2020 (4 pages).

(Continued)

*Primary Examiner* — Jennifer H Gay
(74) *Attorney, Agent, or Firm* — Jeffrey D. Frantz

(57) ABSTRACT

The present disclosure introduces an apparatus including a toolstring for use in a tubular extending into a subterranean formation. The toolstring includes modular components that include one or more caliper modules and a power and control (P/C) module. The one or more caliper modules each include radially rotatable fingers for sensing an internal diameter of the tubular. The P/C module is operable for distributing power and control signals to the one or more (Continued)

caliper modules. The caliper and P/C modules are mechanically and electrically interconnected by common lower interfaces of the caliper and P/C modules.

19 Claims, 9 Drawing Sheets

(51) Int. Cl.
*E21B 47/08* (2012.01)
*G01V 1/40* (2006.01)

(56) References Cited

U.S. PATENT DOCUMENTS

| | | | | |
|---|---|---|---|---|
| 2,908,085 | A | 10/1959 | Price et al. | |
| 3,061,734 | A * | 10/1962 | Broome | E21B 47/08 307/26 |
| 4,192,380 | A * | 3/1980 | Smith | E21B 23/14 166/66.4 |
| 4,299,033 | A * | 11/1981 | Kinley | E21B 47/08 33/544.3 |
| 4,559,709 | A * | 12/1985 | Beseme | G01B 7/287 33/544.3 |
| 4,673,890 | A | 6/1987 | Copland et al. | |
| 5,299,359 | A * | 4/1994 | Estes | G01B 7/13 702/7 |
| 5,531,112 | A * | 7/1996 | Young | G01F 1/74 166/117.7 |
| 5,565,624 | A * | 10/1996 | Deboaisne | E21B 47/08 702/10 |
| 5,947,213 | A * | 9/1999 | Angle | E21B 23/14 166/255.2 |
| 6,112,809 | A * | 9/2000 | Angle | E21B 47/26 175/45 |
| 6,560,889 | B1 | 5/2003 | Lechen | |
| 7,272,504 | B2 * | 9/2007 | Akimov | E21B 47/12 702/9 |
| 7,884,951 | B2 * | 2/2011 | Prouvost | E21B 47/08 356/625 |
| 8,024,868 | B2 * | 9/2011 | Brannigan | E21B 47/08 33/544.3 |
| 8,484,858 | B2 * | 7/2013 | Brannigan | E21B 47/08 33/544.3 |
| 8,849,059 | B2 * | 9/2014 | Scherteler | G06T 3/4061 382/300 |
| 8,925,213 | B2 | 1/2015 | Sallwasser | |
| 9,803,468 | B2 | 10/2017 | Sallwasser | |
| 10,605,582 | B2 | 3/2020 | Ohmer et al. | |
| 10,954,780 | B2 * | 3/2021 | Ge | E21B 47/08 |
| 2008/0149348 | A1 | 6/2008 | DiFoggio | H02N 2/101 166/381 |
| 2008/0266577 | A1 * | 10/2008 | Prouvost | E21B 47/08 385/13 |
| 2010/0319991 | A1 * | 12/2010 | Brannigan | E21B 47/08 175/40 |
| 2012/0055711 | A1 * | 3/2012 | Brannigan | E21B 47/08 175/50 |
| 2012/0239345 | A1 | 9/2012 | Fraser et al. | |
| 2014/0354855 | A1 * | 12/2014 | Venkataraman | G02B 13/0015 348/239 |
| 2015/0285607 | A1 * | 10/2015 | Helmore | G01B 5/12 33/558.2 |
| 2015/0315904 | A1 * | 11/2015 | Manclossi | E21B 47/085 702/9 |
| 2016/0290047 | A1 * | 10/2016 | Foucher | E21B 23/01 |
| 2017/0321540 | A1 * | 11/2017 | Lu | G01V 1/40 |
| 2017/0322332 | A1 * | 11/2017 | Cooper | G01V 1/40 |
| 2018/0172418 | A1 * | 6/2018 | Ohmer | G01B 3/26 |
| 2018/0196005 | A1 | 7/2018 | Fanini et al. | |
| 2021/0180442 | A1 * | 6/2021 | Perrin | G01V 1/40 |
| 2021/0180444 | A1 * | 6/2021 | Perrin | G01B 7/13 |
| 2022/0316318 | A1 | 10/2022 | Almulhim et al. | |

FOREIGN PATENT DOCUMENTS

| | | |
|---|---|---|
| CN | 102102510 A | 6/2011 |
| CN | 102128594 A | 7/2011 |
| CN | 203493482 U | 3/2014 |
| CN | 103837118 A | 6/2014 |
| CN | 204044050 U | 12/2014 |
| CN | 204532342 U | 8/2015 |
| CN | 109489596 A | 3/2019 |
| DE | 3147424 A1 | 6/1983 |
| EP | 1640561 B1 | 5/2008 |
| EP | 2652678 A4 | 2/2016 |
| GB | 818861 A | 8/1959 |
| GB | 2291973 A | 2/1996 |
| RU | 2520884 C1 | 6/2014 |
| WO | 2013082057 A1 | 6/2013 |
| WO | 2016115012 A1 | 7/2016 |
| WO | 2016178939 A1 | 11/2016 |
| WO | 2016201583 A1 | 12/2016 |

OTHER PUBLICATIONS

Govell: Multi-Finger Caliper (MFC) https://static1.squarespace.com/static/5c5146db4eddecf7a88e4a5d/t/5faa2af93511d8442bae0831/1604987705666/WellIntegrity_MFC%2Bcombined-+new.pdf—downloaded on Dec. 1, 2020 (6 pages).
Gelman A. et al., Borehole Image Correspondence and Automated Alignment, ICASSP 2017, New Orleans, USA, Mar. 5-9, 2017 (5 pages).
Partial European Search Report issued in EP Application 19306641.2, dated Nov. 13, 2020 (9 pages).
Extended European Search Report issued in EP Application 19306640.4 dated Nov. 13, 2020, 10 pages.
Office Action issued in U.S. Appl. No. 17/247,268 dated May 16, 2022, 23 pages.
Extended Search Report issued in European Patent Application No. 22163388.6 dated Nov. 9, 2022, 7 pages.
Exam Report issued in EP Application 19306641.2 dated Dec. 1, 2022, 5 pages.
Notice of Allowance issued in U.S. Appl. No. 17/247,271 dated Jan. 17, 2023, 29 pages.
Substantive Exam issued in Saudi Arabia Patent Application No. 120420277 dated Sep. 18, 2023, 12 pages.
First Office Action issued in Chinese Patent Application No. 2020114284216 dated Dec. 30, 2024, 17 pages with English Translation.

* cited by examiner

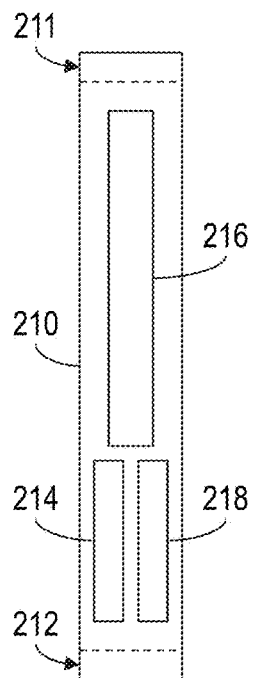
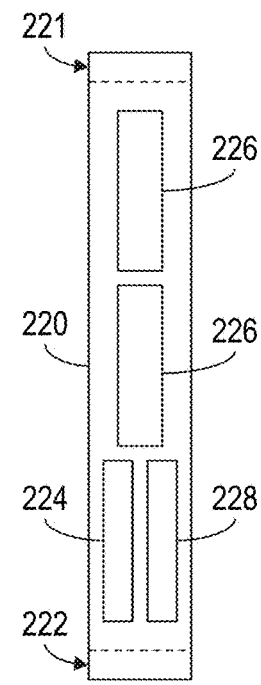
FIG. 3
FIG. 4
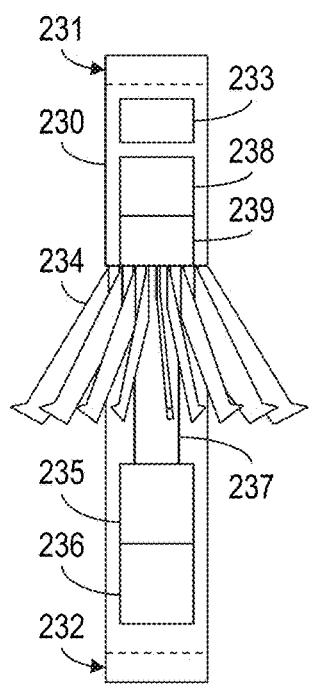
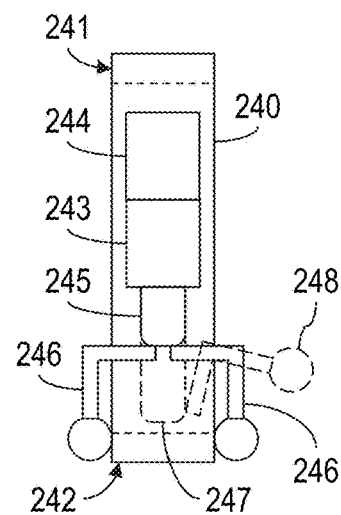
FIG. 5
FIG. 6

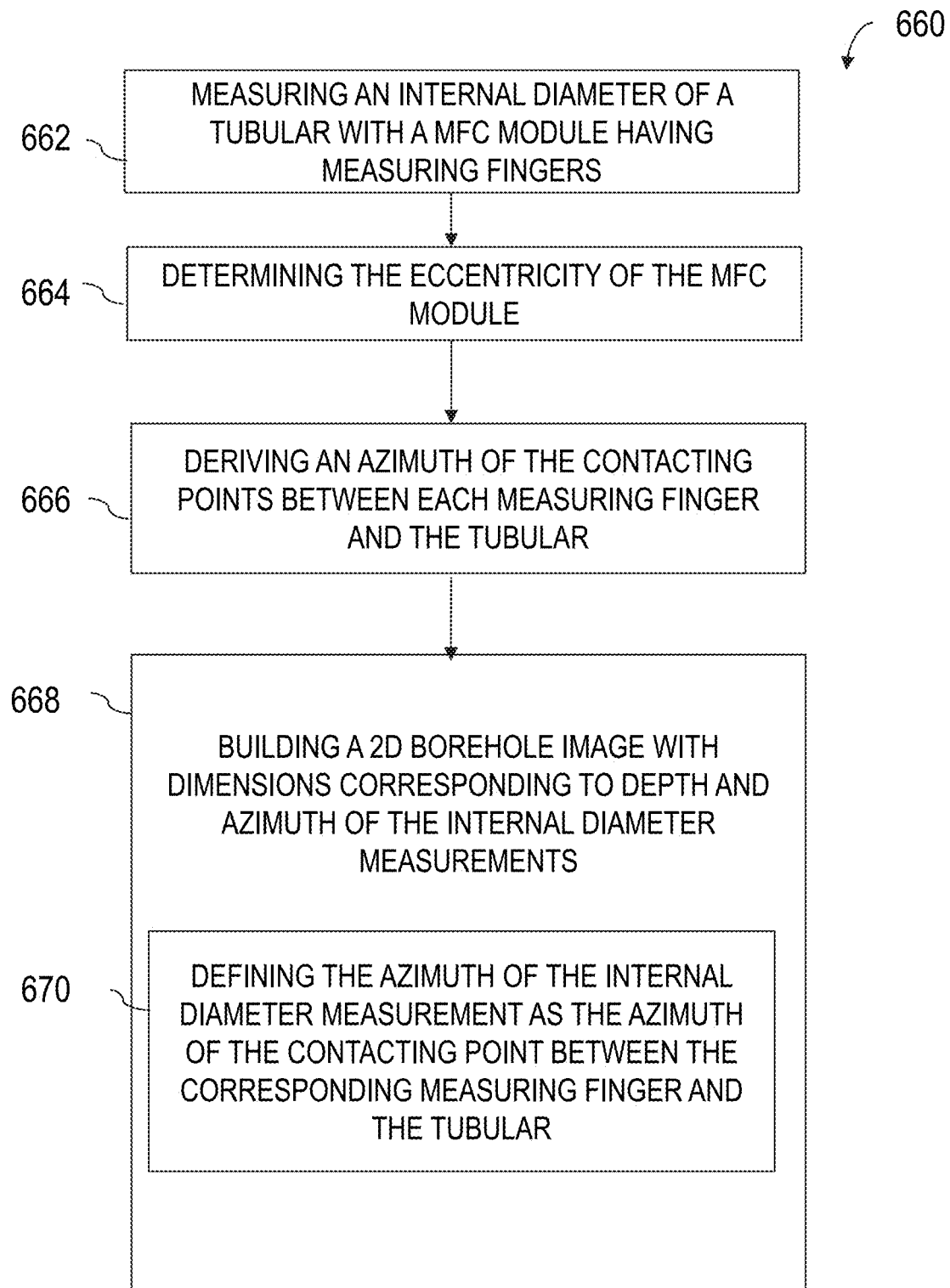
FIG. 14BIS

MODULAR BOREHOLE IMAGING APPARATUS AND METHODS

CROSS-REFERENCE TO RELATED APPLICATIONS

The present application is a continuation of U.S. patent application Ser. No. 17/247,268, titled "Modular Borehole Imaging Apparatus and Methods," filed Dec. 7, 2020, now U.S. Pat. No. 11,555,395, which claims priority to, and the benefit of the earlier filing date of, EP Patent Application No. 19/306,641.2, titled "Modular Borehole Imaging Apparatus and Methods," filed Dec. 12, 2019, the entirety of which is hereby incorporated herein by reference.

BACKGROUND OF THE INVENTION

Assessment of oil/gas well corrosion during the production phase of a well is a complex problem of identifying and characterizing casing corrosion and other defects of various forms caused by many factors. For example, such assessment may not adequately characterize small localized faults (e.g., ditches and holes) in the casing and/or cement securing the casing in the well, may not accurately estimate the operating envelope of the well (e.g., based on the topology of faults and their grouping), and may not adequately identify and quantify reductions in the residual thickness of the casing wall. Moreover, existing assessment means may not be operable in some conditions encountered in the well during the production phase (e.g., gas, live production fluids, clear liquids).

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a toolstring for use in a tubular extending into a subterranean formation. The toolstring includes modular components that include one or more caliper modules and a power and control (P/C) module. The one or more caliper modules each include radially rotatable fingers for sensing an internal diameter of the tubular. The P/C module is operable for distributing power and control signals to the one or more caliper modules. The caliper and P/C modules are mechanically and electrically interconnected by common lower interfaces of the caliper and P/C modules.

The present disclosure also introduces an apparatus including a toolstring for use in a tubular extending into a subterranean formation. The toolstring includes modular components that include one or more caliper modules and a power and control (P/C) module. The one or more caliper modules each include radially rotatable fingers for sensing an internal diameter of the tubular. The P/C module is operable for distributing power and control signals to the one or more caliper modules. The caliper and P/C modules each have an upper and a lower interface, and the lower interfaces of the caliper and P/C modules are identical. The caliper and P/C modules are mechanically and electrically interconnectable via interconnection of upper interface of the caliper and lower interface of the P/C modules.

The present disclosure also introduces a method including obtaining first and second borehole image logs that are each a two-dimensional matrix. Depths of measurements of a parameter in a borehole are depicted along a first dimension of the matrix, azimuths of the measurements of the parameter in the borehole are depicted along a second dimension of the matrix, and values of the measurements of the parameter are depicted by different colors at the corresponding measurement depths and azimuths. The method also includes aligning the second borehole image log to the first borehole image log with respect to depth, then aligning the depth-aligned second borehole image log to the first borehole image log with respect to azimuth, and then merging the depth- and azimuth-aligned second borehole image log with the first borehole image log to obtain a third borehole image log having a resolution greater than each resolution of the first and second borehole image logs.

The present disclosure also introduces a method including running a toolstring to a target depth in a borehole. The toolstring includes an first (generally upper) tool and a second (generally lower) tool. The first tool is a multi-finger caliper (MFC) module. The method also includes extending sensing fingers of the MFC module. The method also includes logging with standard parameters until a defect is detected via operation of the MFC module at a first resolution, and then logging a zone of interest containing the defect via operation of the second tool at a second resolution greater than the first resolution.

The present disclosure also introduces a method including measuring an internal diameter of a tubular with an MFC module having measuring fingers distributed azimuthally around the MFC module. Each finger contacts the tubular at a respective contacting point. The method also includes determining the eccentricity of the MFC module at least at a particular depth based on at least three internal diameter measurements and deriving the azimuth of the contacting points of each measuring finger with the tubular. The method also includes building a borehole image log that is a two-dimensional matrix. Depths of measurements of the internal diameter in a borehole are depicted along a first dimension of the matrix, azimuths of the measurements of the internal diameter in the borehole are depicted along a second dimension of the matrix, and values of the internal diameter measurements are depicted by different colors at the corresponding measurement depths and azimuths. Building the borehole image log includes defining each measurement azimuth at the at least particular depth as the azimuth of the contacting point between the corresponding measuring finger and the tubular.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 3 is a schematic view of at least a portion of an example implementation of a power and control (P/C) module of the MFC system according to one or more aspects of the present disclosure.

FIG. 4 is a schematic view of at least a portion of another example implementation of a P/C module of the MFC system according to one or more aspects of the present disclosure.

FIG. 5 is a schematic view of at least a portion of an example implementation of a caliper module of the MFC system according to one or more aspects of the present disclosure.

FIG. 6 is a schematic view of at least a portion of an example implementation of a centralizer module of the MFC system according to one or more aspects of the present disclosure.

FIG. 14BIS depicts a flow-chart diagram of at least a portion of an example implementation of a method of building an image using the toolstring.

DETAILED DESCRIPTION

Figure 1:
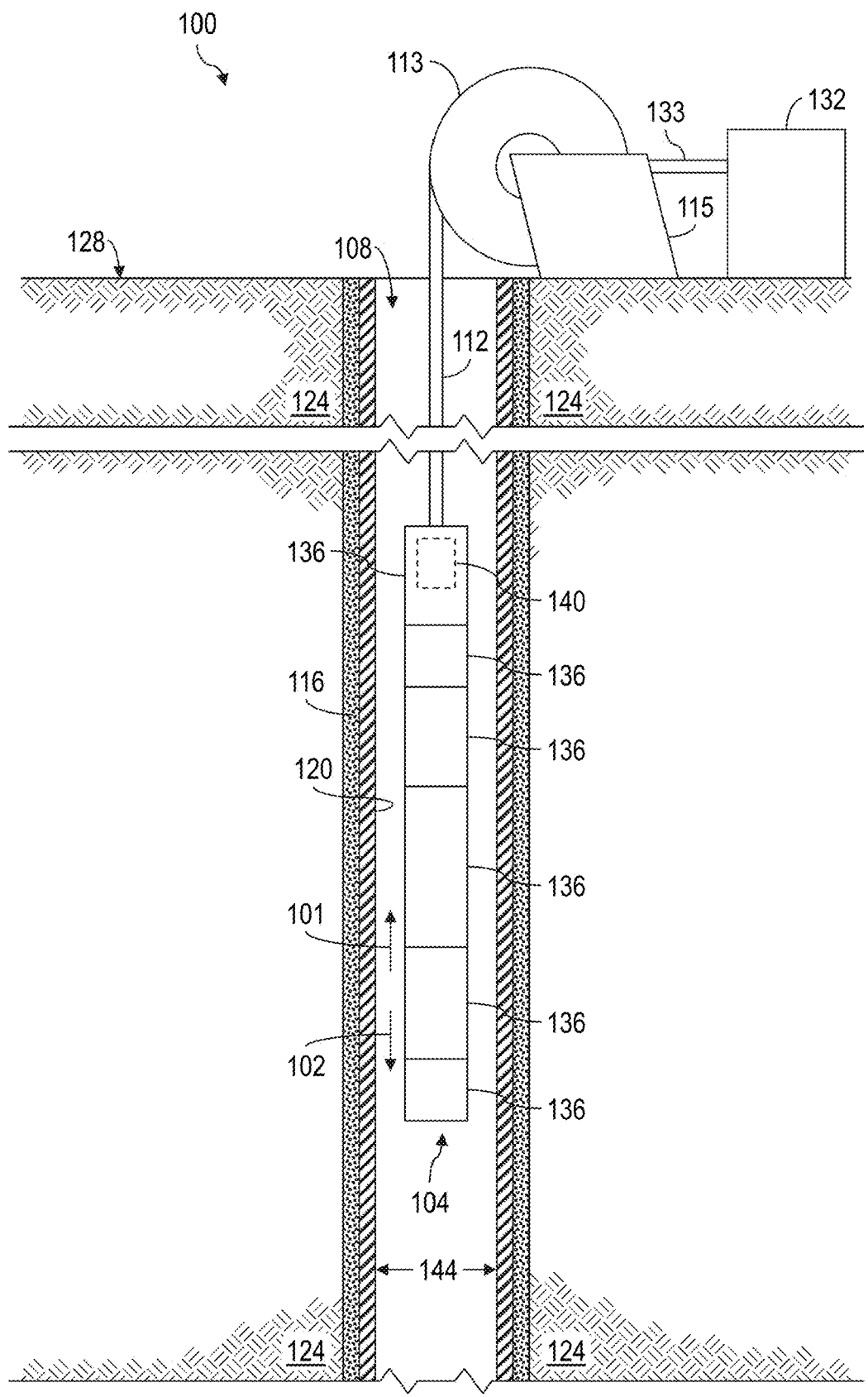
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic view of at least a portion of an example implementation of a wellsite system 100 to which one or more aspects of the present disclosure may be applicable. The wellsite system 100 may be onshore or offshore. In the example wellsite system 100 shown in FIG. 1, a toolstring 104 is conveyed into a borehole 108 via a wireline, slickline, and/or other conveyance means 112. The example wellsite system 100 may be utilized for evaluation of the borehole 108, cement 116 securing casing 120 within the borehole 108, a tubular (not shown) secured in the casing 120 (e.g., production services tubing), and/or a subterranean formation 124 penetrated by the borehole 108.

The toolstring 104 is suspended in the borehole 108 from the lower end of the conveyance means 112. The conveyance means 112 may be a single- or multi-conductor slickline or wireline logging cable spooled on a drum 113 of a winch 115 at the surface 128 of the wellsite from whence the borehole 108 extends. The wellsite surface 128 is the generally planar surface of the terrain (i.e., Earth's surface), a floor of a rig (not shown) at the wellsite, or other equipment at the wellsite, which is perpendicularly penetrated by the borehole 108. Operation of the winch 155 rotates the drum 113 to reel in the conveyance means 112, thus pulling the toolstring 104 in an uphole direction 101 in the borehole 108, and to reel out the conveyance means 112, thus moving the toolstring 104 in a downhole direction 102 in the borehole 108. The conveyance means 112 may include at least one conductor that facilitates data communication between the toolstring 104 and surface equipment 132 disposed at the wellsite surface 128, including through one or more slip rings, cables, and/or other conductors 133 electrically connecting the one or more conductors of the conveyance means 112 with the surface equipment 132. However, in other implementations, such communication conductor(s) may not exist or may otherwise not facilitate data communication, in which case data may be stored downhole until the toolstring 104 is retrieved from the borehole 108.

Although not illustrated as such in FIG. 1, the winch 115 may be disposed on a service vehicle or a stationary skid/platform. The service vehicle or stationary skid/platform may also contain at least a portion of the surface equipment 132.

The toolstring 104 comprises a plurality of modules 136 each comprising an elongated housing and/or mandrel carrying various electronic and/or mechanical components. For example, at least one of the modules 136 may be or comprise at least a portion of a device for measuring a feature and/or characteristic of the borehole 108, the casing 120, the cement 116, and/or the formation 124, and/or a device for obtaining sidewall or inline core and/or fluid (liquid and/or gas) samples from the borehole 108 and/or formation 124. Other implementations of the downhole toolstring 104 within the scope of the present disclosure may include additional or fewer components or modules 136 relative to the example implementation depicted in FIG. 1.

The wellsite system 100 also includes a data processing system that may include at least a portion of one or more of the surface equipment 132, control devices and/or other electrical and/or mechanical devices in one or more of the modules 136 of the toolstring 104 (such as a downhole controller 140), a remote computer system (not shown), communication equipment, and/or other equipment. The data processing system may include one or more computer systems or devices and/or may be a distributed computer system. For example, collected data or information may be stored, distributed, communicated to a human wellsite operator, and/or processed locally (downhole or at surface) or remotely.

The data processing system may, individually or in combination with other system components, perform the methods and/or processes described below, or portions thereof. For example, the data processing system may include processor capability for collecting caliper, acoustic, ultrasonic, and/or other data related to the evaluation of the cement 116, the casing 120, and/or the formation 124 according to one or more aspects of the present disclosure. Methods and/or processes within the scope of the present disclosure may be implemented by one or more computer programs that run in a processor located, for example, in one or more modules 136 of the toolstring 104 and/or the surface equipment 132. Such programs may utilize data received from the downhole controller 140 and/or other modules 136 via the conveyance means 112, and may transmit control signals to operative elements of the toolstring 104. The programs may be stored on a tangible, non-transitory, computer-usable storage medium associated with the one or more processors of the downhole controller 140, other modules 136 of the toolstring 104, and/or the surface equipment 132, or may be stored on an external, tangible, non-transitory, computer-usable storage medium that is electronically coupled to such processor(s). The storage medium may be one or more known or future-developed storage media, such as a magnetic disk, an optically readable disk, flash memory, or a readable device of another kind, including a remote storage device coupled over a communication link, among other examples.

At least one of the modules 136 may be or comprise a multi-finger measuring or caliper (MFC) tool operable for acquiring measurements of the diameter of the inner wall of the casing 120 (or another tubular, such as production tubing). For example, the measuring fingers move radially in response to undulations of the inner diameter (ID) 144 of the casing 120 as the toolstring 104 is conveyed in the uphole direction 101, thereby detecting changes in the ID 144 of the casing 120. That is, the MFC tool transforms such radial movement of the tips of the fingers into a linear translational motion measured by a displacement sensor, such as a linear variable differential transformer (LVDT) sensor, permitting measurements in one direction. The multiple fingers are distributed around the circumference of the MFC tool, such that a mapping of a measured section of the casing 120 can be generated by integrating the different measuring points associated with the different fingers. In drilling and production environments, these tools may be utilized to evaluate corrosion, erosion, wear, bending, eccentricity, buckling, holes, and other faults in the borehole 108, the casing 120, and/or a tubular (not shown) installed in the casing 120. The MFC tool may also be used to measure the accumulation of scale, paraffin, and/or other deposits on the inner wall of the casing 120.

Existing MFC tools are generally offered in three tool sizes to cover the range of existing casings and conveyance types, namely, a small MFC tool with 24 fingers and an outer diameter (OD) of about 1.7 centimeters (cm), a medium MFC tool with 40 fingers and an OD of about 7.0 cm, and a large MFC tool with 60 fingers and an OD of about 8.6 cm. However, supporting three different MFC tool sizes increases financial costs, logistics complexity, and related maintenance operations.

Figure 2:
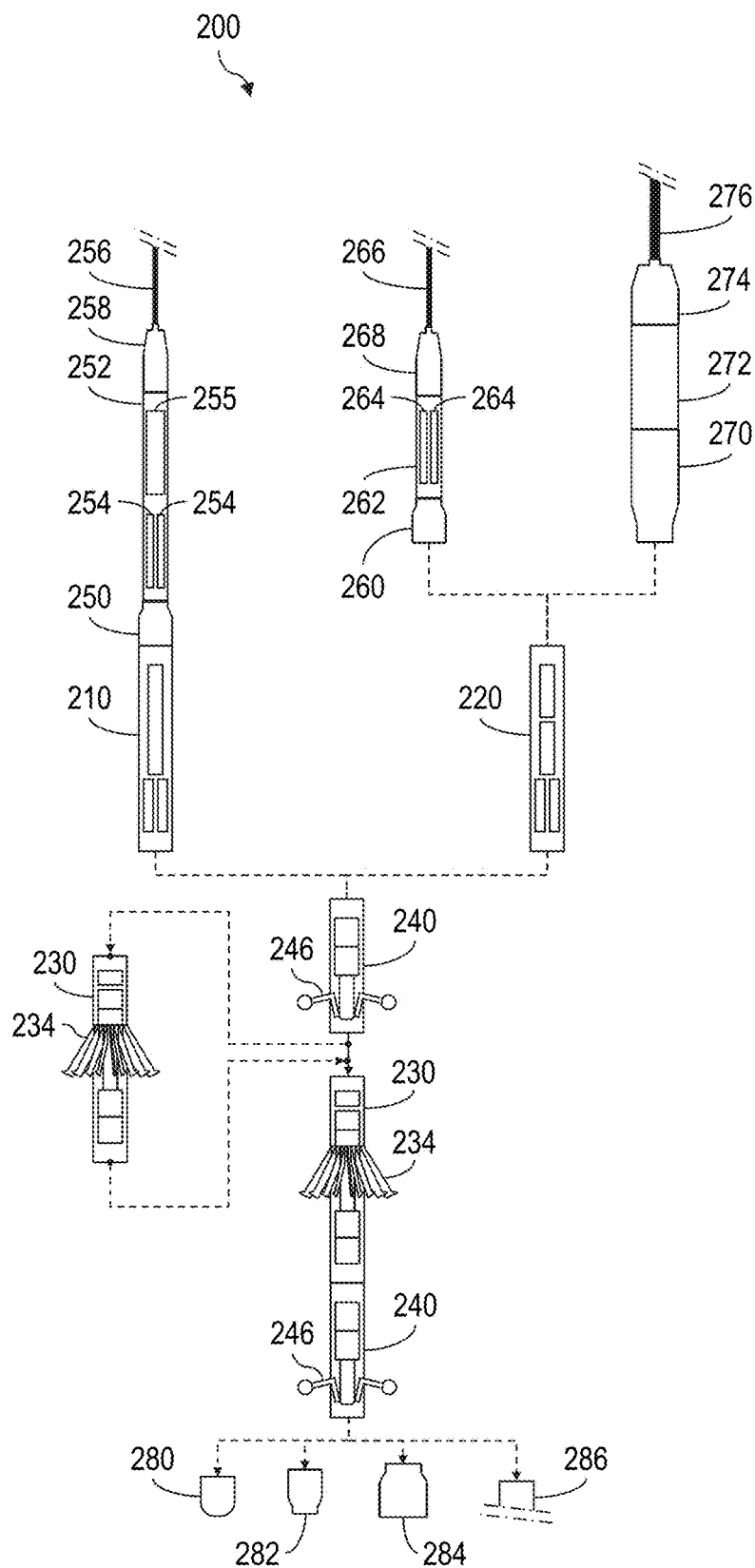
FIG. 2 is a schematic view of at least a portion of an example implementation of a multi-finger caliper (MFC) system according to one or more aspects of the present disclosure.

FIG. 2 is a schematic diagram of at least a portion of an example implementation of an MFC system 200 according to one or more aspects of the present disclosure. The example MFC system 200 supports different types of conveyances supported by the three MFC tool sizes to which the industry is accustomed. The example MFC system 200 also supports combinability with the sizes, connectors, and interoperability of the different non-MFC tools commonly assembled in toolstrings having an MFC tool. The example MFC system 200 is also able to mechanically support the load of such toolstrings, even those with larger ODs (e.g., modules with an OD of about 8.6 cm or greater). The example MFC system 200 may be utilized in casing, other tubulars (e.g., production tubing), and boreholes of the various IDs to which the industry is accustomed. Accordingly, the example MFC system 200 may offer a financial benefit over existing systems, in that a single instance of the MFC system 200 may replace the conventional three different-sized MFC tools. The example MFC system 200 may offer similar benefits in the context of logistics and/or maintenance.

The MFC system 200 has a modular architecture comprising one or more power and control (P/C) modules 210, 220, a caliper module 230, and a centralizer module 240. Each toolstring (e.g., toolstring 104 in FIG. 1) comprising components of the MFC system 200 includes one of the P/C modules 210, 220, one or two (or more) instances of the caliper module 230, and optionally one or two (or more) instances of the centralizer module 240. Each P/C module 210, 220 is operable for distributing power and control signals to the one or more caliper modules 230 and the one or more centralizer modules 240. Each caliper module 230 comprises a plurality of radially rotatable fingers 234 for sensing an ID of a casing, other tubular, or borehole. Each centralizer module 240 is operable for centralizing the one or more caliper modules 230 within the casing, other tubular, or borehole.

The MFC system 200 may also comprise an adapter 250 for mechanically and electrically connecting the P/C module 210 to a conventional or future-developed telemetry module 252 configured for slickline operations. For example, the adapter 250 may mechanically and electrically connect the P/C module 210, which may have a first OD and a predetermined number of electrical connection pins (e.g., 22 pins), with the telemetry module 252, which may have a different OD and the same or a different number of electrical connection pins (here, e.g., 22 as well). The telemetry module 252 may comprise one or more telemetry boards (or cartridges) 254 operable for data communication over a slickline cable 256. The telemetry module 252 may also comprise a battery pack and/or other electrical energy storage means 255, such as for electrically powering the one or more telemetry boards 254. A conventional or future-developed slickline logging head 258 may mechanically and electrically connect the slickline telemetry module 252 with the slickline cable 256.

The MFC system 200 may also comprise an adapter 260 for mechanically and electrically connecting the P/C module 220 to a conventional or future-developed telemetry module 262 configured for production services (PS) wireline operations. For example, the adapter 260 may mechanically and electrically connect the P/C module 220, which has the first OD and the predetermined number of electrical connection pins, with the telemetry module 252, which may have a different OD and the same or a different number of electrical connection pins (here, e.g., 22 as well). The telemetry module 262 may comprise one or more telemetry boards (or cartridges) 264 operable for data communication over a PS wireline cable 266. A conventional or future-developed PS wireline logging head 268 may mechanically and electrically connect the PS wireline telemetry module 262 with the PS wireline cable 266.

The MFC system 200 may also comprise an adapter 270 for mechanically and electrically connecting the P/C module 220 to a conventional or future-developed telemetry module 272 configured for wireline logging operations. For example, the adapter 270 may mechanically and electrically connect the P/C module 220, which has the first OD and a predetermined number of electrical connection pins, with the telemetry module 252, which may have a different OD (e.g., about 8.6 cm) and the same or a different number of electrical connection pins (e.g., 31 pins). A conventional or future-developed wireline logging head 274 may mechanically and electrically connect the wireline logging telemetry module 272 with the wireline cable 276.

The MFC system 200 may also comprise a conventional bottom nose device 280 for forming the downhole end of the toolstring, an adapter 282 for mechanically and electrically connecting the lowermost caliper module 230 or centralizer module 240 (e.g., having the first OD (e.g., about 5.4 cm) and a predetermined number (e.g., 22) of electrical connection pins) to a smaller-diameter toolstring component (e.g., having a different, smaller OD (e.g., about 4.3 cm) and the predetermined number (e.g., 22) or a different number of electrical connection pins), and/or an adapter 284 for mechanically and electrically connecting the lowermost module 230, 240 (e.g., having an OD of about 5.4 cm and 22 electrical connection pins) to a larger-diameter toolstring component (e.g., having a larger OD (e.g., about 8.6 cm) and a different number (e.g., 31) of electrical connection pins). The lowermost module 230, 240 may be connected to one of the bottom nose device 280, the adapter 282, or the adapter 284. Alternatively, the lowermost module 230, 240 may be connected directly to another toolstring component 286, such as another downhole tool, such as a corrosion platform tool, having for example at least an ultrasonic transducer and/or an electromagnetic sensor.

FIG. 3 is a schematic view of at least a portion of an example implementation of the P/C module 210 according to one or more aspects of the present disclosure. The P/C module 210 comprises an upper interface 211 and a lower interface 212 for mechanical and electrical connection of the P/C module 210 to neighboring components of the toolstring. The mechanical portions of the upper and lower interfaces 211, 212 may comprise threads and/or other means (not shown) for mechanically coupling with the neighboring toolstring components. The electrical portions of the upper and lower interfaces 211, 212 may comprise electrical connection pins/sockets and/or other means (not shown) for electrically coupling with the neighboring toolstring components.

The P/C module 210 also comprises a master board (or cartridge) 214 that includes various integrated circuit (IC) components (chips, modules, etc.), electrical connections, and other devices collectively operable to dictate and manage the different functions of the caliper and centralizer modules 230, 240, such as to control motor actuations, memory, and other functions of the modules 230, 240. The master board 214 also interfaces to one or more telemetry boards 254 of the telemetry module 252, such that surface equipment (e.g., surface equipment 132 of FIG. 1, which may include a depth time recorder, or DTR) may be utilized to perform data acquisition, tool control, and power distribution to the components of the MFC system 200 in the toolstring. The P/C module 210 also comprises a battery pack and/or other electrical energy storage means 216, and the master board 214 controls distribution of electrical power from the electrical energy storage means 216 to the caliper and centralizer modules 230, 240. The P/C module 210 also comprises a memory board (or cartridge) 218 operable to acquire and save data generated and/or acquired via operation of the P/C module 210, the caliper module(s) 230, the centralizer module(s) 240, and/or other modules/tools of the toolstring.

FIG. 4 is a schematic view of at least a portion of an example implementation of the P/C module 220 according to one or more aspects of the present disclosure. The P/C module 220 comprises an upper interface 221 and a lower interface 222 for mechanical and electrical connection of the P/C module 220 to neighboring components of the toolstring. The upper and lower interfaces 221, 222 are substantially similar or identical to the upper and lower interfaces 211, 212 of the P/C module 220.

The P/C module 220 also comprises a master board (or cartridge) 224 that includes various IC components (chips, modules, etc.), electrical connections, and other devices collectively operable to dictate and manage the different functions of the caliper and centralizer modules 230, 240, such as to control motor actuations, memory, and other functions of the modules 230, 240. The master board 224 also interfaces to one or more telemetry boards 264 of the telemetry module 262, and to the telemetry module 272, such that surface equipment (e.g., surface equipment 132 of FIG. 1, such as Schlumberger's Wireline Acquisition Front-End, or WAFE) may be utilized to perform data acquisition, tool control, and power distribution to the components of the MFC system 200 in the toolstring. The P/C module 220 also comprises one or more power supplies 226, such as to convert high voltage (e.g., 200 VDC) on the PS wireline cable 266 or wireline cable 276 to a lower voltage (e.g., 12 VDC), and the master board 224 controls distribution of electrical power from the power supply 226 to the caliper and centralizer modules 230, 240. The P/C module 220 also comprises a memory board (or cartridge) 228 operable to acquire and save data generated and/or acquired via operation of the P/C module 220, the caliper module(s) 230, the centralizer module(s) 240, and/or other modules/tools of the toolstring.

FIG. 5 is a schematic view of at least a portion of an example implementation of the caliper module 230 according to one or more aspects of the present disclosure. The caliper module 230 comprises an upper interface 231 and a lower interface 232 for mechanical and electrical connection of the caliper module 230 to neighboring components of the toolstring. The lower interface 232 is substantially similar or identical to the lower interfaces 212, 222 of the P/C modules 210, 220.

The caliper module 230 comprises an electric motor 235 driven by a controller 236. The motor 235 is operable to move an actuator 237 and/or other means for actively extending ("opening") and retracting ("closing") the sensing fingers 234. A data acquisition device 238 receives caliper data from a block 239 of sensors each corresponding to one of the fingers 234. For example, the displacement of each individual finger 234 may be linked to a linear displacement sensor (such as a differential variable reluctance transducer (DVRT), an inductive sensor, and/or other sensors) that translates radial displacement of the radially outer tip of that finger 234 to linear motion. The linear displacements are converted to electrical signals (e.g., via inductance variation) via the sensors 239 and/or the data acquisition device 238. The electric signals may be further converted to digital signals, whether by the data acquisition device 238 or the master boards 214, 224 of the P/C modules 210, 220. The digital signals may be conveyed to surface via the slickline cable 256 or wireline cable 266, 276. The digital signals may also or instead be saved to downhole memory, such as of the data acquisition device 238 and/or the memory boards 218, 228 of the P/C modules 210, 220.

During acquisition of the caliper data, the position (e.g., depth and azimuth) of the caliper module 230 may also be acquired in real-time. For example, the caliper module 230 (or another component of the MFC system 200) may comprise various position sensors 233 operable in acquiring the position data in real-time. A position sensor 233 may be associated with each finger 234 of the caliper module 230. Such sensors 233 may comprise one or more accelerometers (e.g., three-axis accelerometers), gyroscopic sensors (e.g., three-axis gyroscopic sensors), load cells, and/or other sensors. In some implementations, the position sensors 233 may comprise a combination of sensor types, such as three-axis accelerometers and three-axis gyroscopic sensors.

FIG. 6 is a schematic view of at least a portion of an example implementation of the centralizer module 240 according to one or more aspects of the present disclosure. The centralizer module 240 comprises an upper interface 241 and a lower interface 242 for mechanical and electrical connection of the centralizer module 240 to neighboring components of the toolstring. The upper interface 241 is substantially similar or identical to the upper interface 231 of the caliper module 230. The lower interface 242 is substantially similar or identical to the lower interfaces 212, 222 of the P/C modules 210, 220 and the lower interface 232 of the caliper module 230. The centralizer module 240 may otherwise be, comprise, or function via conventional or future-developed centralizing means.

For example, the centralizer module 240 may comprise an electric motor 243 driven by a controller 244. The motor 243 may be operable to move an actuator 245 and/or other means for actively extending ("opening") and retracting ("closing") a plurality of centralizing arms 246. Although only two centralizing arms 246 are depicted in the example implementation shown in FIG. 6, other implementations within the scope of the present disclosure may have more than two centralizing arms 246. When the actuator 245 is in a retracted position (as depicted in FIG. 6 by solid lines), the centralizing arms 246 may be in retracted positions (also depicted in FIG. 6 by solid lines). Extension of the actuator 245 (as depicted in FIG. 6 by dashed lines 247) may extend the centralizing arms 246 to extended positions (as depicted in FIG. 6 by dashed lines 248). Retraction of the actuator 245 permits retraction of the centralizing arms 246, perhaps in conjunction with one or more springs and/or other biasing means (not shown) urging the centralizing arms 246 toward their retracted positions.

Extension of the centralizing arms 246 aids in urging the caliper module(s) 230 to a central position within the casing, other tubular, or borehole being investigated by the caliper module(s) 230. One or more implementations of toolstrings within the scope of the present disclosure may include an instance of the centralizer module 240 at each end of each caliper module 230. Other toolstring implementations within the scope of the present disclosure may include two or more instances of the caliper module 230 coupled end-to-end between two opposing instances of the centralizer module 240.

Figure 7:
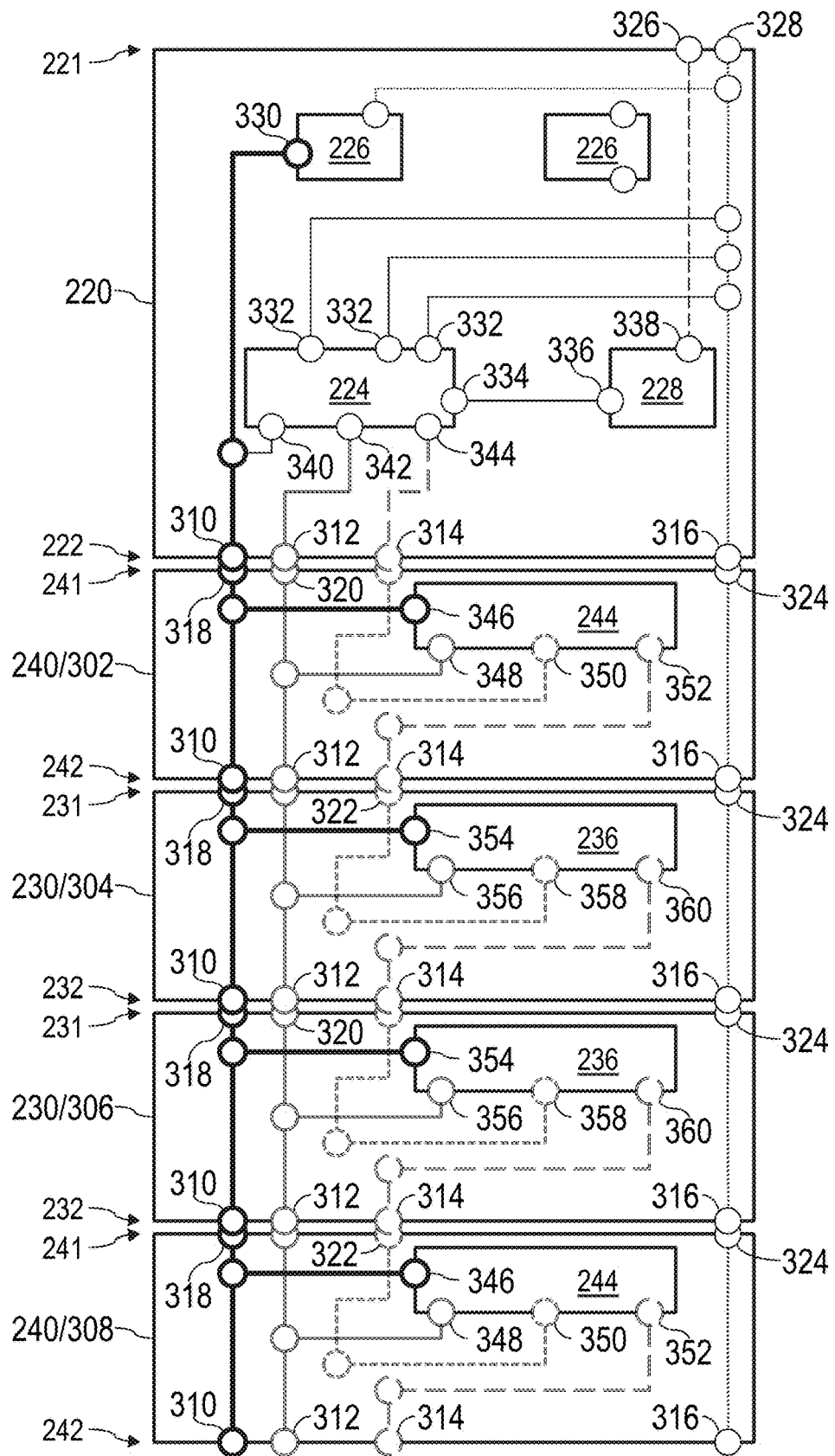
FIG. 7 is an electrical schematic view of a portion of an example implementation of a toolstring comprising modules of the MFC system according to one or more aspects of the present disclosure.

FIG. 7 is an electrical schematic view of an example implementation of a portion of a toolstring 300 comprising the P/C module 220, an upper instance 302 of the centralizer module 240, an upper instance 304 of the caliper module 230, a lower instance 306 of the caliper module 230, and a lower instance 308 of the centralizer module 240. The lower interface 222 of the P/C module 220, the lower interfaces 232 of the caliper modules 230, and the lower interfaces 242 of the centralizer modules 240 each comprise substantially similar electrical connections (pins, sockets, etc.) for a direct current (DC) power-out connection 310 (depicted in FIG. 7 by heavy lines), a first-signal-out connection 312 (depicted in FIG. 7 by double lines), a second-signal-out connection 314 (depicted in FIG. 7 by dashed double lines), and an alternating current (AC) power-out connection 316 (depicted in FIG. 7 by dotted lines). The upper interfaces 231 of the caliper modules 230 and the upper interfaces 241 of the centralizer modules 240 each comprise substantially similar electrical connections (pins, sockets, etc.) for a DC power-in connection 318, a first-signal-in connection 320, a second-signal-in connection 322, and an AC power-in connection 324.

Accordingly, the example implementation depicted in FIG. 7 illustrates that the lower interfaces (212, 222, 232, 242) of the P/C modules 210, 220, the caliper modules 230, and the centralizer modules 240 may be substantially similar, or even identical, and that the upper interfaces (231, 241) of the caliper modules 230 and the centralizer modules 240 may be substantially similar, or even identical. Such similarity may be with regard to the number, type, size, and physical location of the electrical connections. Although not illustrated in FIG. 7, such similarity may also be with regard to the type, size, and physical location of the means for mechanical coupling with the neighboring modules of the toolstring.

The upper interface 221 of the P/C module 220 depicted in the example schematic shown in FIG. 7 includes electrical connections (pins, sockets, etc.) for a telemetry connection 326 and an AC power-in connection 328. At least one of the power supplies 226 is connected to the AC power-in connection 328 and outputs DC power (via a connection 330) to the DC power-out connection 310. The AC power-out connection 316 is connected to the AC power-in connection 328. One or more connections 332 of the master board 224 are also connected to the AC power-in connection 328. A connection 334 of the master board 224 is connected to a connection 336 of the memory board 228. A connection 338 of the memory board is connected to the telemetry connection 326. A connection 340 of the master board 224 is connected to DC power (between connections 330 and 310). A first-signal-out connection 342 of the master board 224 is connected to the first-signal-out connection 312 of the P/C module 220, and a second-signal-out connection 344 of the master board 224 is connected to the second-signal-out connection 314 of the P/C module 220. The P/C module 210 described above may have similar connections to those of the P/C module 220 depicted in FIG. 7.

The controller 244 of each centralizer module 240 depicted in FIG. 7 includes a connection 346 to DC power, a connection 348 to the first-signal connections 312, 320, a connection 350 to the second-signal-in connection 322 of that centralizer module 240, and a connection 352 to the second-signal-out connection 314 of that centralizer module

240. The AC power-out connection 316 is connected to the AC power-in connection 324.

The controller 236 of each caliper module 230 depicted in FIG. 7 includes a connection 354 to DC power, a connection 356 to the first-signal connections 312, 320, a connection 358 to the second-signal-in connection 322 of that caliper module 230, and a connection 360 to the second-signal-out connection 314 of that caliper module 230. The AC power-out connection 316 is connected to the AC power-in connection 324.

Figure 8:
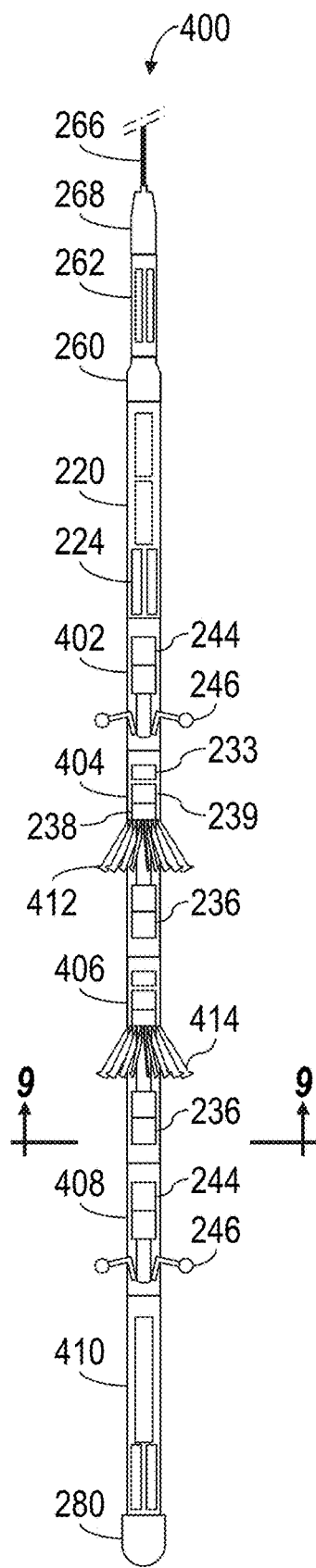
FIG. 8 is a schematic view of at least a portion of an example implementation of a toolstring comprising components of the MFC system according to one or more aspects of the present disclosure.

FIG. 8 is a schematic view of an example implementation of a toolstring 400 comprising components of the MFC system 200 according to aspects of the present disclosure. The toolstring 400 may form at least a portion of, and/or otherwise be utilized as, a corrosion measurement system for assessing corrosion levels and locations of casing or other tubulars (e.g., the casing 120 of FIG. 1). The toolstring 400 includes the wireline logging head 268 connecting the toolstring 400 to the wireline cable 266. The telemetry module 262 is connected to the wireline logging head 268. The adapter 260 connects the P/C module 220 to the telemetry module 262. An upper instance 402 of the centralizer module 240 is connected to the P/C module 220. An upper instance 404 of the caliper module 230 is connected to the upper instance 402 of the centralizer module 240. A lower instance 406 of the caliper module 230 is connected to the upper instance 404 of the caliper module 230. A lower instance 408 of the centralizer module 240 is connected to the lower instance 406 of the caliper module 230. One or more other tools 410 may be connected to the lower instance 408 of the centralizer module 240, such as an ultrasonic measurement tool, and electromagnetic measurement tool (such as for measuring eddy currents), and/or other acoustic measurement tools. The bottom nose 280 may form the downhole end of the toolstring 400.

Figure 9:
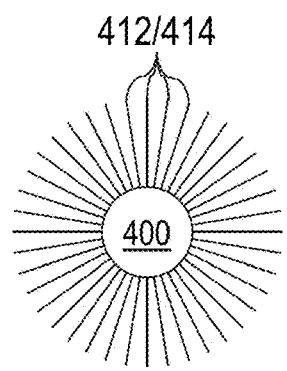
FIG. 9 is a sectional view of the toolstring shown in FIG. 8.
Figure 10:
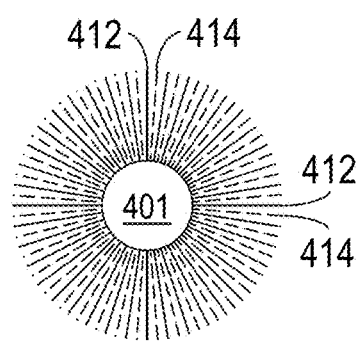
FIG. 10 is a sectional view of another implementation of a toolstring similar to the toolstring shown in FIGS. 8 and 9.

The sensing fingers 234 of the upper instance 404 of the caliper module 230 are designated by reference number 412 in FIG. 8. Similarly, the sensing fingers 234 of the lower instance 406 of the caliper module 230 are designated by reference number 414. The sensing fingers 412 of the upper instance 404 of the caliper module 230 may be azimuthally aligned with the sensing fingers 414 of the lower instance 406 of the caliper module 230, as depicted in FIG. 9, which is a sectional view of the toolstring 400. However, in other implementations, the sensing fingers 412 of the upper instance 404 of the caliper module 230 may be azimuthally offset relative to the sensing fingers 414 of the lower instance 406 of the caliper module 230, as depicted in FIG. 10, which is a sectional view of another implementation of a toolstring 401 identical to the toolstring 400 other than the azimuthal offset of the sensing fingers 412, 414. For clarity purposes, the sensing fingers 412 are depicted in FIG. 10 by solid lines, while the sensing fingers 414 are depicted by dashed lines.

Apparatus according to one or more aspects of the present disclosure may permit easier management of tool maintenance. For example, if a module of the toolstring is not functioning properly at a job location, a replacement module can be shipped to the job location instead of shipping an entire replacement toolstring. Moreover, the modules of the present disclosure may be used separately. For example, the centralizer module 240 may be added to an additional tool to form (at least partially) a toolstring that doesn't include a caliper module 230.

Further, the configuration of the toolstring may be adapted to the particular job, for instance, the number of centralizer modules 240 depending on the toolstring length. Such flexibility permits, for example, having just one size of caliper module 230 to log different diameters of casings. Indeed, if a greater casing diameter is logged, two (or more) caliper modules 230 may be directly connected, including with azimuthally offset fingers 234, which permits a greater resolution relative to utilizing just one caliper module 230. The position sensors 233 permit combining the data obtained with both caliper modules 230, as described below.

Figure 11:
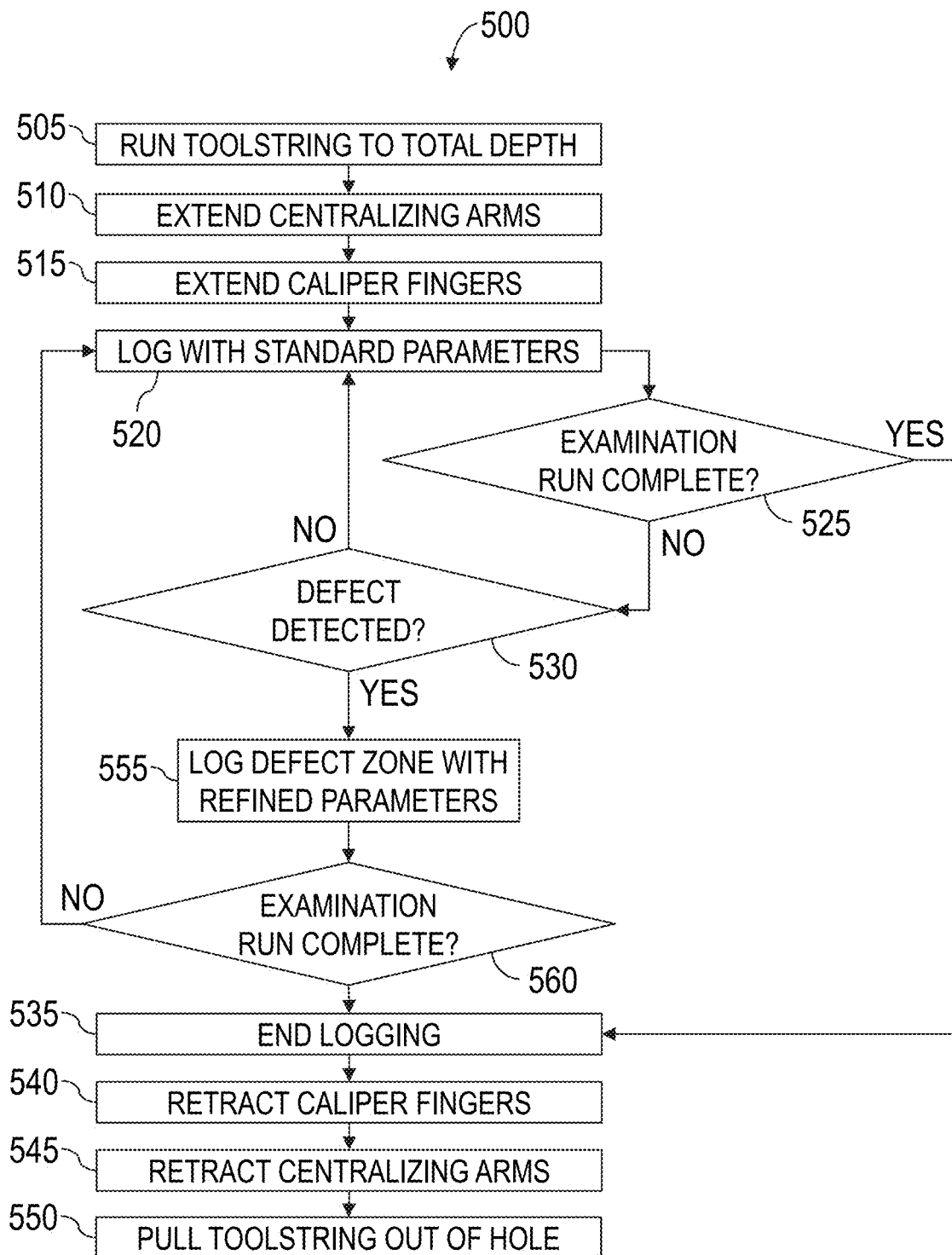
FIG. 11 is a flow-chart diagram of at least a portion of an example implementation of a logging method according to one or more aspects of the present disclosure.

FIG. 11 is a flow-chart diagram of at least a portion of an example implementation of a method 500 according to one or more aspects of the present disclosure. The method 500 is one example of various methods within the scope of the present disclosure that may be performed utilizing, or otherwise in conjunction with, toolstrings comprising components of the MFC system 200 depicted in FIG. 2. For example, the method 500 depicted in FIG. 11 may be performed utilizing the toolstring 400 depicted in FIGS. 8 and 9, or the toolstring 401 depicted in FIG. 10. Thus, the following description refers to FIGS. 8-11, collectively.

The method 500 comprises running 505 the toolstring 400 to total depth within a borehole (e.g., the borehole 108 depicted in FIG. 1). During this phase, the sensing fingers 412, 414 of the caliper modules 404, 406 and the centralizing arms 246 of the centralizer modules 402, 408 are retracted. The caliper modules 404, 406 are then centralized within the casing, other tubular, or borehole being examined (e.g., casing 120 depicted in FIG. 1) by extending 510 the centralizing arms 246 of the centralizer modules 402, 408. The sensing fingers 412, 414 of the caliper modules 404, 406 are then extended 515, thus contacting the ID of the casing, tubular, or borehole being examined. As described above, the extension 510 of the centralizing arms 246 of the centralizer modules 402, 408 and the extension 515 of the sensing fingers 412, 414 of the caliper modules 404, 406 may be controlled by the master board 224 of the P/C module 220, such as via corresponding control signals sent to the controllers 244 of the centralizer modules 402, 408 and the controllers 236 of the caliper modules 404, 406.

Logging 520 then begins utilizing standard parameters. For example, the logging 520 may be performed by pulling the toolstring 400 in the uphole direction at a speed of about 550 meters per hour (m/hr) while the MFC sensors 239, the position sensors 233, and the data acquisition devices 238 cooperate to obtain MFC data at a first resolution and corresponding position data. The logging 520 with the standard parameters continues until the MFC examination run is complete, as depicted in FIG. 11 by determination 525, or until a defect is detected, as depicted in FIG. 11 by determination 530. The defects that may be detected 530 may include corrosion or deformation of a form or shape of the casing, tubular, or borehole being examined. If no defects are detected 530 and the MFC examination run is complete 525, then logging ends 535, the sensing fingers 412, 414 of the caliper modules 404, 406 are retracted 540, the centralizing arms 246 of the centralizer modules 402, 408 are retracted 545, and the toolstring 400 is pulled 550 out of the borehole.

However, if a defect is detected 530 before the MFC examination run is complete 525, then logging 555 with refined parameters begins via several actions performed by the P/C module 220. For example, a request may be sent to the surface equipment to decrease the speed at which the toolstring 400 is pulled in the uphole direction through a vertical zone of interest containing the detected 530 defect. The zone of interest may extend uphole from the detected 530 defect to a predetermined length between about one meter and about ten meters, such as about five meters. The speed at which the toolstring 400 is pulled in the uphole direction through the zone of interest may be reduced relative to the speed of the standard parameters. For example, the reduced speed may be about 180 m/hr. The reduced speed permits the lower caliper module 406 to acquire MFC data in the zone of interest at a higher resolution than the MFC data obtained by the upper caliper module 404 when the defect was initially detected 530 and/or relative to the one or more additional tools 410 to acquire data. Reducing the velocity of displacement also reduces the bouncing effect the fingers could undergo while pulling at full regime, increasing measurement accuracy.

The higher resolution MFC data acquired by the lower caliper module 406 may be acquired through the same longitudinal paths traversed by the sensing fingers 412 of the upper caliper module 404 if the sensing fingers 414 of the lower caliper module 406 are azimuthally aligned with the sensing fingers 412 of the upper caliper module 404, as depicted in FIG. 9, or through different longitudinal paths azimuthally offset from the paths traversed by the sensing fingers 412 of the upper caliper module 404 if the sensing fingers 414 of the lower caliper module 406 are azimuthally offset relative to the sensing fingers 412 of the upper caliper module 404, as depicted in FIG. 10. The higher resolution may be obtained because the additional tool 410 offers a greater resolution. The second resolution is greater than the first resolution utilized during the logging 520 with the standard parameters. For example, the second resolution may be two, three, four, or more times the first resolution.

Instead of or in addition to decreasing the speed at which the toolstring 400 is pulled uphole through the zone of interest, the refined parameters utilized during the logging 555 may pertain to adjustments to operational parameters of the additional tools 410 (via, for example, control signals received from the P/C module 220), such that the parameters measured by the additional tools are adapted in view of the detected default by setting up the additional tool with predefined operational parameters.

If the full MFC examination run is not complete after the zone of interest is logged 555 with the refined parameters, as depicted in FIG. 11 by determination 560, then the logging 520 with the standard parameters continues until the MFC examination run is complete 525 or another defect is detected 530. However, if the full MFC examination run is complete 560 after the zone of interest is logged 555 with the refined parameters, then logging ends 535, the sensing fingers 412, 414 of the caliper modules 404, 406 are retracted 540, the centralizing arms 246 of the centralizer modules 402, 408 are retracted 545, and the toolstring 400 is pulled 550 out of the borehole.

During the logging 520 with the standard parameters, the lower caliper module 406 may be operating to acquire MFC and position data at the same resolution that the upper caliper module 404 is acquiring MFC and position data, or the lower caliper module 406 may be in a sleep mode in which no MFC data is being acquired. During the logging 555 with the refined parameters, the lower caliper module 406 may acquire the MFC and position data at the higher second resolution, while the upper caliper module 404 may acquire the MFC and position data at the second resolution or the lower first resolution.

Figure 12:
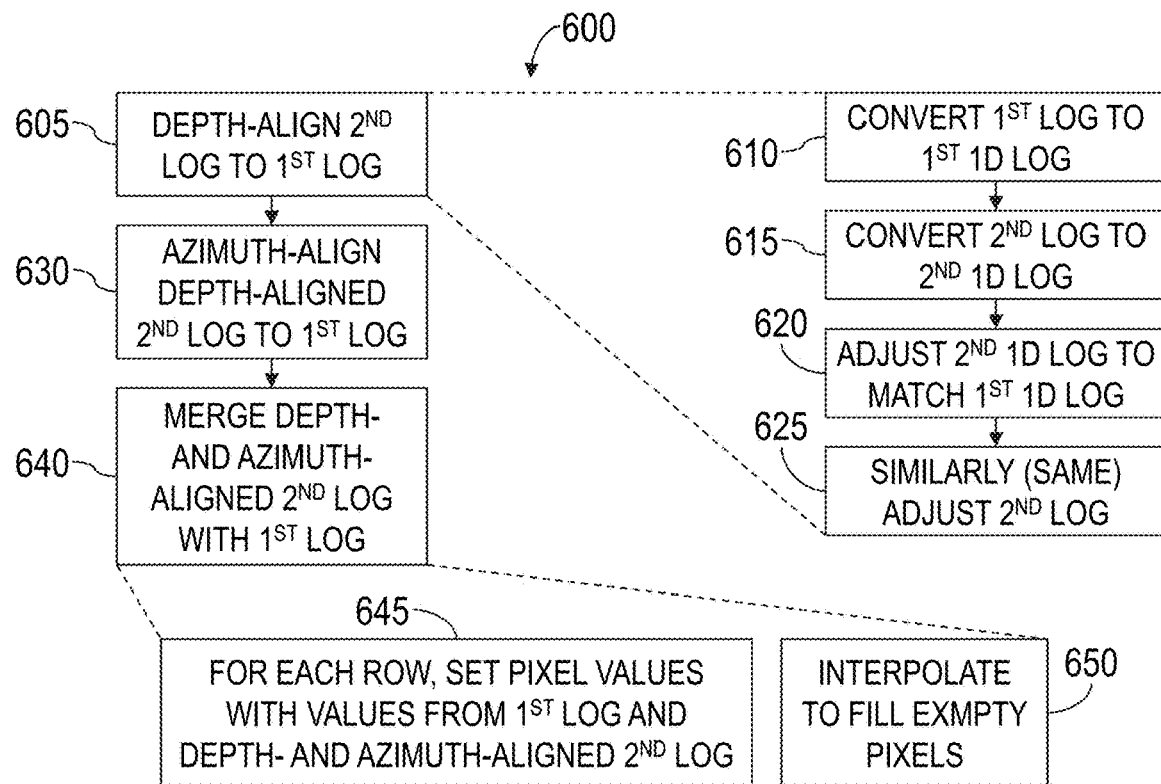
FIG. 12 is a flow-chart diagram of at least a portion of an example implementation of a method of merging borehole image logs according to one or more aspects of the present disclosure.

FIG. 12 is a flow-chart diagram of at least a portion of an example implementation of a method 600 of merging first and second borehole image logs according to one or more aspects of the present disclosure, so as to obtain a third borehole image log having a resolution greater than each resolution of the first and second logs. The first and second borehole image logs may be the MFC data acquired by the upper and lower instances of the caliper module 230 in the same toolstring, such as the upper and lower caliper modules 404, 406 depicted in FIG. 9, perhaps via performance of the method 500 depicted in FIG. 11. However, the first and second borehole image logs may also be obtained via other methods (within the scope of the present disclosure or otherwise), whether via utilization of toolstrings comprising components of the MFC system 200 described above, other toolstrings within the scope of the present disclosure, and/or other tools, including tools not operable to obtain MFC data. The first and second borehole image logs may be obtained utilizing a toolstring comprising two caliper modules 230 during a single examination run, by a toolstring comprising one caliper module 230 during two examination runs, or by a first toolstring comprising one caliper module 230 (or more) during a first examination run and a second toolstring comprising one caliper module 230 (or more) during a second examination run.

Figure 13:
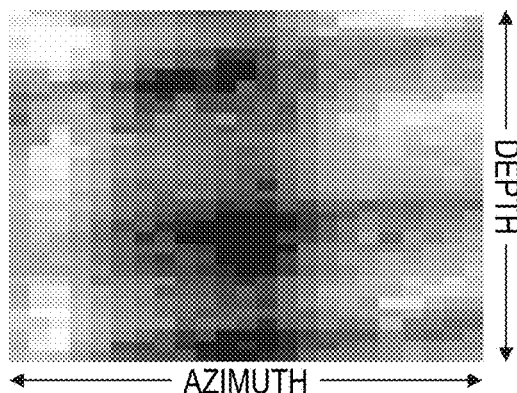
FIG. 13 is an example borehole image log.

The first and second borehole image logs are each a two-dimensional (2D) matrix, wherein depths of measurements of a parameter in a casing, tubular, or borehole (hereafter collectively "borehole") are depicted along a first dimension of the matrix, azimuths of the measurements of the parameter in the borehole are depicted along a second dimension of the matrix, and values of the measurements of the parameter are depicted by different colors at the corresponding measurement depths and azimuths. An example borehole image log is depicted in FIG. 13.

The method 600 comprises aligning 605 the second borehole image log to the first borehole image log with respect to depth. Such alignment 605 may comprise converting 610 the first borehole image log into a first one-dimensional (1D) log relating the parameter measurements to depth, converting 615 the second borehole image log into a second 1D log relating the parameter measurements to depth, performing 620 a positioning and/or compression and/or dilation adjustment of the second 1D log relative to the first 1D log sufficient to match the second 1D log to the first 1D log, and performing 625 the same positioning and/or compression adjustment on the second (2D) borehole image log. Such positioning adjustment is necessary as the logging of each zone may not have been performed at the same speed with the caliper modules. The positioning and/or compression and/or dilation adjustment may be performed with any appropriate algorithm, such as a warping algorithm. Converting 610, 615 the first and second borehole image logs into the respective first and second 1D logs may comprise obtaining minimum, maximum, and average values of the parameter measurements at each depth at which a parameter measurement exists in both of the first and second borehole image logs. Such adjustment is possible because it realigns both caliper data relative to low frequency details of the image, such as manufacturing patterns including casing collars.

The depth-aligned 605 second borehole image log is then aligned 630 to the first borehole image log with respect to azimuth. Such alignment 630 may comprise, at each depth at which a parameter measurement exists in both the first borehole image log and the depth-aligned 605 second borehole image log, rotating the depth-aligned 605 second borehole image log sufficient to match the depth-aligned 605 second borehole image log to the first borehole image log based on cross-correlation of data of the first and second images at each depth for each rotation angle of the second borehole image at a predetermined depth. In other words, several rotation angles are tested for the second borehole image at a predetermined depth, and the correlation with the first image at the predetermined depth is calculated and the rotation angle having the maximal correlation value is selected.

Figure 14:
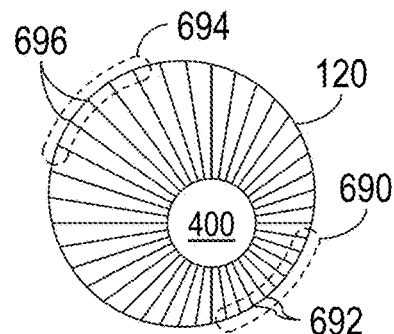
FIG. 14 depicts an example toolstring, eccentered within a casing, according to one or more aspects of the present disclosure.

It is to be noted that measurements obtained by the fingers 234 may not be regularly distributed in the azimuthal direction on the image. In this case, the disclosure may include a method 660 as shown on FIG. 14BIS. This method includes measuring (662) the internal diameter of the caliper with a MFC module 230 as already described. Then, the caliper module(s) 230 may be utilized (664) to determine eccentricity of the toolstring (or portion thereof) in the borehole at one depth (at least) based on at least three measurements of the measuring fingers 234. From this measurement, the azimuth of the contacting points of each measuring finger 234 and the tubular may be derived (666). An 2D image as presented above may be built (668) taking into account the eccentricity by defining the measurement azimuth as the azimuth of the contacting point of the finger on the tubular (670), versus regularly distributing the measurement azimuths. For example, as depicted in FIG. 14, if an image contains 100 pixels in an azimuthal dimension, then in a first azimuthal measurement zone 690, two measurement values 692 may be disposed so that they are separated by just one pixel, while in a second azimuthal measurement zone 694, two measurement values 696 may be disposed on the image so that they are separated by two pixels. This may permit obtaining an accurate indication of defects in the casing (or other tubular), including dimensions of the defects.

The depth- and azimuth-aligned 630 second borehole image log is then merged 640 with the first borehole image log to obtain a third borehole image log having a resolution greater than each resolution of the first and second borehole image logs. The merging 640 may comprise super-resolution of the first borehole image log utilizing the depth- and azimuth-aligned 630 second borehole image log.

Figure 15:
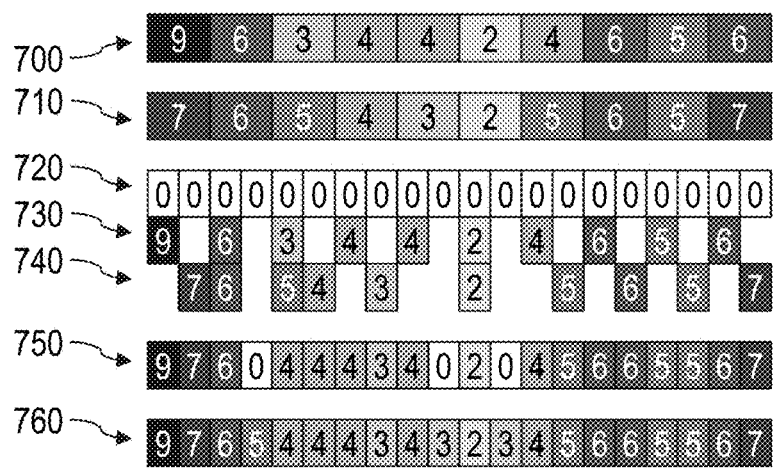
FIG. 15 depicts pixels in rows of example borehole image logs before and after merging according to the method depicted in FIG. 12.

For example, each row in the first borehole image log comprises a number P of pixels. FIG. 15 depicts an example row 700 in the first borehole image log, and an example row 710 in the depth- and azimuth-aligned 630 second borehole image log, wherein each row 700, 710 comprises ten pixels (i.e., P=10), and each pixel comprises a numeric value of the measured parameter and is shaded corresponding to the numeric value. Merging 640 the depth- and azimuth-aligned 630 second borehole image log with the first borehole image log may be contemplated in terms of each row in the first borehole image log. For example, for each pixel in an array of N pixels, wherein N is greater than P, and wherein each of the N pixels corresponds to one of a plurality of azimuthal ranges that collectively span the row in the first borehole image log, the merging 640 may comprise setting 645 a value of the measured parameter for that pixel equal to an average of values of the parameter measurements in the first borehole log and the depth- and azimuth-aligned 630 second borehole image log that correspond to azimuthal locations within the azimuthal range corresponding to that pixel. Thus, continuing with the example shown in FIG. 15, an empty array 720 of twenty pixels (i.e., N=20) is depicted in vertical alignment with the azimuthally-corresponding pixels 730 of the first borehole image log row 700 and the azimuthally-corresponding pixels 740 of the depth- and azimuth-aligned 630 second borehole image log row 710, and row 750 depicts setting 645 the pixel values equal to the average parameter measurements. For each pixel corresponding to an azimuthal range in which no parameter measurements in the first borehole log and the depth- and azimuth-aligned 630 second borehole image log exist, the measured parameter value for that pixel is set 650 to an interpolated value determined utilizing the value set 645 for neighboring pixels, as depicted by row 760 in FIG. 15. It can also be noted on FIG. 15 that the measured values of the second caliper are not regularly distributed in a row 740 of the depth- and azimuth-aligned 630 second borehole image log, which is a representation corresponding to an eccentered caliper as explained above.

The set 645 average values may be mean averages with no weighting or other discrimination between the first borehole image log and the depth- and azimuth-aligned 630 second borehole image log. However, the set 645 average values may be weighted averages giving more influence to the first borehole image log, such as in implementations in which the depth-alignment 605 and/or the azimuth-alignment 630 of the second borehole image log may be suspected of introducing processing errors. Such weighting may be based on predetermined and/or user-defined values.

The number N may be at least twice as big as a maximum theoretical resolution M. For example, if the first and second borehole image logs comprise MFC data according to aspects described above, M may be based on a quotient of the width of the sensing fingers 234 and the ID of the casing, tubular, or borehole examined. More generally, M may be related to the resolution of the device that measures tool azimuth, such as M=360/azimuth resolution. For example, if the azimuth is precise to 0.1 degrees, then M=3600.

Implementations of the method 600 within the scope of the present disclosure may also be utilized to merge more than two borehole image logs. In such implementations, the first borehole image log may be considered to be a reference borehole image log, whereas second, third, fourth, etc., borehole image logs may be considered to be candidate borehole image logs. Each candidate borehole image log is depth-aligned 605 to the reference borehole image log. Each depth-aligned 605 candidate borehole image log is then azimuth-aligned 630 to the reference borehole image log. The depth- and azimuth-aligned 630 candidate borehole image logs are then merged 640 with the reference borehole image log, such as via the above-described averaging 645 and interpolation 650.

Figure 16:
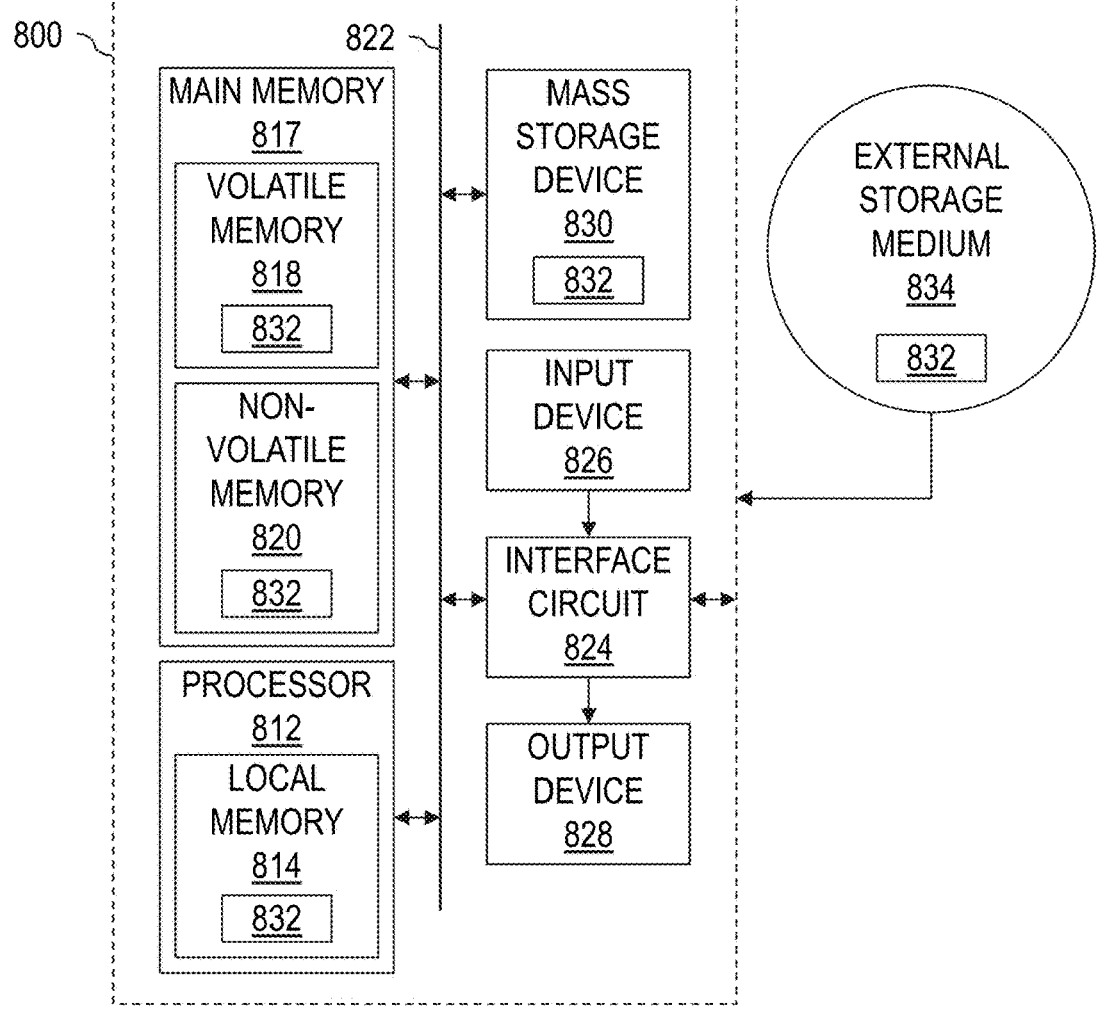
FIG. 16 is a schematic view of at least a portion of an example implementation of apparatus according to one or more aspects of the present disclosure.

FIG. 16 is a schematic view of at least a portion of an example implementation of a processing system 800 according to one or more aspects of the present disclosure. The processing system 800 may execute example machine-readable instructions to implement at least a portion of one or more of the methods and/or processes described herein, and/or to implement a portion of one or more of the example downhole tools described herein. The processing system 800 may be or comprise, for example, one or more processors, controllers, special-purpose computing devices, servers, personal computers, personal digital assistant (PDA) devices, smartphones, internet appliances, and/or other types of computing devices. The entirety or a portion of the processing system 800 may be implemented within downhole apparatus described above, including for performing at least a portion of the method 500 shown in FIG. 11, the method 600 shown in FIG. 12, and/or other aspects described above. For example, at least a portion of the processing system 800 shown in FIG. 16 may be utilized in the environment of FIG. 1 in conjunction with MFC and/or other borehole image log acquisition and/or processing according to one or more aspects of the present disclosure. One or more components or functions of the processing system 800 may also or instead be implemented in wellsite surface equipment, perhaps including the surface equipment 132 depicted in FIG.

1. One or more components or functions of the processing system 800 may also or instead be implemented in the P/C modules 210, 220, the caliper modules 230, and/or the centralizer modules 240 described above.

The processing system 800 may comprise a processor 812, such as a general-purpose programmable processor, for example. The processor 812 may comprise a local memory 814 and may execute program code instructions 832 present in the local memory 814 and/or another memory device. The processor 812 may execute, among other things, machine-readable instructions or programs to implement the methods and/or processes described herein. The programs stored in the local memory 814 may include program instructions or computer program code that, when executed by an associated processor, cause a controller and/or control system implemented in surface equipment and/or a downhole tool to perform tasks as described herein. The processor 812 may be, comprise, or be implemented by one or more processors of various types operable in the local application environment, and may include one or more general-purpose processors, special-purpose processors, microprocessors, digital signal processors (DSPs), field-programmable gate arrays (FPGAs), application-specific ICs (ASICs), processors based on a multi-core processor architecture, and/or other processors.

The processor 812 may be in communication with a main memory 817, such as via a bus 822 and/or other communication means. The main memory 817 may comprise a volatile memory 818 and a non-volatile memory 820. The volatile memory 818 may be, comprise, or be implemented by random-access memory (RAM), static RAM (SRAM), dynamic RAM (DRAM), synchronous DRAM (SDRAM), RAMBUS DRAM (RDRAM), and/or other types of RAM devices. The non-volatile memory 820 may be, comprise, or be implemented by read-only memory, flash memory, and/or other types of memory devices. One or more memory controllers (not shown) may control access to the volatile memory 818 and/or the non-volatile memory 820.

The processing system 800 may also comprise an interface circuit 824. The interface circuit 824 may be, comprise, or be implemented by various types of standard interfaces, such as an Ethernet interface, a universal serial bus (USB), a third-generation input/output (3GIO) interface, a wireless interface, and/or a cellular interface, among other examples. The interface circuit 824 may also comprise a graphics driver card. The interface circuit 824 may also comprise a communication device, such as a modem or network interface card, to facilitate exchange of data with external computing devices via a network, such as via Ethernet connection, digital subscriber line (DSL), telephone line, coaxial cable, cellular telephone system, and/or satellite, among other examples.

One or more input devices 826 may be connected to the interface circuit 824. One or more of the input devices 826 may permit a user to enter data and/or commands for utilization by the processor 812. Each input device 826 may be, comprise, or be implemented by a keyboard, a mouse, a touchscreen, a trackpad, a trackball, an image/code scanner, and/or a voice recognition system, among other examples.

One or more output devices 828 may also be connected to the interface circuit 824. One or more of the output devices 828 may be, comprise, or be implemented by a display device, such as a liquid crystal display (LCD), a light-emitting diode (LED) display, and/or a cathode ray tube (CRT) display, among other examples. One or more of the output devices 828 may also or instead be, comprise, or be implemented by a printer, speaker, and/or other examples.

The processing system 800 may also comprise a mass storage device 830 for storing machine-readable instructions and data. The mass storage device 830 may be connected to the interface circuit 824, such as via the bus 822. The mass storage device 830 may be or comprise a floppy disk drive, a hard disk drive, a compact disk (CD) drive, and/or digital versatile disk (DVD) drive, among other examples. The program code instructions 832 may be stored in the mass storage device 830, the volatile memory 818, the non-volatile memory 820, the local memory 814, and/or on a removable storage medium 834, such as a CD or DVD.

The mass storage device 830, the volatile memory 818, the non-volatile memory 820, the local memory 814, and/or the removable storage medium 834 may each be a tangible, non-transitory storage medium. The modules and/or other components of the processing system 800 may be implemented in accordance with hardware (such as in one or more IC chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

In view of the entirety of the present disclosure, including the figures and the claims, a person having ordinary skill in the art will readily recognize that the present disclosure introduces an apparatus comprising a toolstring for use in a tubular extending into a subterranean formation, wherein the toolstring comprises a plurality of modular components that includes: one or more caliper modules each comprising a plurality of radially rotatable fingers for sensing an internal diameter of the tubular; and a power and control (P/C) module operable for distributing power and control signals to the one or more caliper modules; wherein the caliper and P/C modules each have an upper and a lower interface, wherein the lower interfaces of the caliper and P/C modules are identical, wherein the caliper and P/C modules are mechanically and electrically interconnectable via interconnection of upper interface of the caliper and lower interface of the P/C modules.

In addition to the above, the person having ordinary skill in the art will readily recognize that the present disclosure introduces an apparatus comprising a toolstring for use in a tubular extending into a subterranean formation, wherein the toolstring comprises a plurality of modular components that includes: one or more caliper modules each comprising a plurality of radially rotatable fingers for sensing an internal diameter of the tubular; and a power and control (P/C) module operable for distributing power and control signals to the one or more caliper modules; wherein the wherein the caliper and P/C modules are mechanically and electrically interconnected via common lower interfaces of the caliper and P/C modules The plurality of modular components may further include one or more centralizer modules operable for centralizing the one or more caliper modules within the tubular, the P/C module may be operable for distributing power and control signals to the one or more centralizer modules, wherein the caliper, P/C and centralizer modules each have lower and upper interfaces, wherein the upper interfaces of at least the caliper and centralizer modules are identical, wherein the lower interfaces of the caliper, P/C and centralizer modules are identical, wherein the caliper, centralizer, and P/C modules are mechanically and electrically interconnectable via interconnection of the upper interface of a first module with the lower interface of a second module, wherein the first and second modules are distinct modules and wherein the first module includes at least one of the caliper and centralizer module, and with the second module includes at least one of the caliper, P/C and centralizer modules.

The plurality of modular components may further include one or more centralizer modules operable for centralizing the one or more caliper modules within the tubular, the P/C module may be operable for distributing power and control signals to the one or more centralizer modules, and the caliper, centralizer, and P/C modules may be mechanically and electrically interconnected by: common upper interfaces of the caliper and centralizer modules; and common lower interfaces of the caliper, centralizer, and P/C modules.

The toolstring may be configured for conveyance within the tubular via one of a plurality of different types of conveyance means, and the modular components may be operable for use with each of the different types of conveyance means. The toolstring may further comprise: a logging head for connecting with the one type of conveyance means but not with at least one of the other types of conveyance means; and a telemetry module connected between the logging head and the P/C module, wherein the telemetry module may be operable with the one type of conveyance means but not with at least one of the other types of conveyance means. The toolstring may further comprise one of a plurality of different adapters, the different adapters may each be for use with one of the different types of conveyance means but not with at least one of the other types of conveyance means, and the one adapter may be connected between the telemetry module and the P/C module.

The P/C module may comprise memory for storing data generated by the one or more caliper modules.

The caliper module may be operable to actively open and close the fingers.

Each caliper module may be operable to sense the internal diameter of the tubular by measuring displacement of each finger via, for each finger, a linear displacement sensor that translates radial displacement of the finger to linear displacement of an outer tip of the finger in contact with the internal diameter of the tubular. Each caliper module may be operable to: convert the linear displacement of each finger to an electrical analog signal; and convert the electrical analog signal to a digital signal.

The toolstring may comprise at least a first and a second caliper module, and the fingers of the second caliper module may be azimuthally offset relative to the fingers of the first caliper module. The lower interface of one of the first and second caliper modules may be connected to an upper interface of the other of the first and second caliper modules.

The one or more caliper modules may comprise one or more position sensors operable for determining depth and/or azimuth of the one or more caliper modules comprising the one or more position sensors.

The toolstring may further comprise an additional tool for performing an additional measurement, and the P/C module may be configured to command operation of the additional tool based on data obtained by the one or more caliper modules.

The P/C module may be configured to command a change in an operating parameter of the apparatus based on data obtained by the one or more caliper modules.

The present disclosure also introduces a method comprising: obtaining first and second borehole image logs that are each a two-dimensional matrix, wherein depths of measurements of a parameter in a borehole are depicted along a first dimension of the matrix, azimuths of the measurements of the parameter in the borehole are depicted along a second dimension of the matrix, and values of the measurements of the parameter are depicted by different colors at the corresponding measurement depths and azimuths; then aligning the second borehole image log to the first borehole image log with respect to depth; then aligning the depth-aligned second borehole image log to the first borehole image log with respect to azimuth; and then merging the depth- and azimuth-aligned second borehole image log with the first borehole image log to obtain a third borehole image log having a resolution greater than each resolution of the first and second borehole image logs.

Aligning the second borehole image log to the first borehole image log with respect to depth may comprise: converting the first borehole image log into a first one-dimensional log relating the parameter measurements to depth; converting the second borehole image log into a second one-dimensional log relating the parameter measurements to depth; performing a positioning and/or compression and/or dilation adjustment of the second one-dimensional log relative to the first one-dimensional log sufficient to match the second one-dimensional log to the first one-dimensional log; and performing the same positioning and/or compression and/or dilation adjustment on the second borehole image log. Converting the first and second borehole image logs into the respective first and second one-dimensional logs may comprise obtaining minimum, maximum, and average values of the parameter measurements at each depth at which a parameter measurement exists in both of the first and second borehole image logs. Aligning the depth-aligned second borehole image log to the first borehole image log with respect to azimuth may comprise, at each depth at which a parameter measurement exists in both the first borehole image log and the depth-aligned second borehole image log, rotating the depth-aligned second borehole image log sufficient to match the depth-aligned second borehole image log to the first borehole image log.

Merging the depth- and azimuth-aligned second borehole image log with the first borehole image log may comprise super-resolution of the first borehole image log utilizing the depth- and azimuth-aligned second borehole image log.

The measured parameter may be internal diameter of a tubular in the borehole.

Each row in the first borehole image log may comprise a number P of pixels, and merging the depth- and azimuth-aligned second borehole image log with the first borehole image log may comprise, for each row in the first borehole image log: for each pixel in an array of N pixels, wherein N is greater than P, and wherein each of the N pixels corresponds to one of a plurality of azimuthal ranges that collectively span the row in the first borehole image log, setting a value of the measured parameter for that pixel equal to an average of values of the parameter measurements in the first borehole log and the depth- and azimuth-aligned second borehole image log that correspond to azimuthal locations within the azimuthal range corresponding to that pixel; and then for each pixel corresponding to an azimuthal range in which no parameter measurements in the first borehole log and the depth- and azimuth-aligned second borehole image log exist, setting the measured parameter value for that pixel to an interpolated value determined utilizing the set values for neighboring pixels. N may be at least twice as big as a maximum theoretical resolution.

The present disclosure also introduces a method comprising: running a toolstring to a target depth in a borehole, wherein the toolstring comprises an first (in particular upper) tool and a second (in particular lower) tool, and wherein the first tool is an MFC module; extending sensing fingers of the MFC module; and logging with standard parameters until a defect is detected via operation of the MFC module at a first resolution, and then logging a zone of interest containing the defect via operation of the second tool at a second resolution greater than the first resolution.

The MFC module may be a first MFC module, the second tool may be a second MFC module, logging the zone of interest may comprise logging with refined parameters, and the refined parameters may include a lower logging speed than of the standard parameters.

The second tool may be an ultrasonic tool or an electromagnetic tool.

The present disclosure also introduces a method comprising: measuring an internal diameter of a tubular with an MFC module comprising a plurality of measuring fingers distributed azimuthally around the MFC module, wherein each finger contacts the tubular at a respective contacting point; determining the eccentricity of the MFC module at least at a particular depth based on at least three internal diameter measurements and deriving the azimuth of the contacting points of each measuring finger with the tubular; and building a borehole image log that is a two-dimensional matrix, wherein depths of measurements of the internal diameter in a borehole are depicted along a first dimension of the matrix, azimuths of the measurements of the internal diameter in the borehole are depicted along a second dimension of the matrix, and values of the internal diameter measurements are depicted by different colors at the corresponding measurement depths and azimuths, and wherein building the borehole image log includes defining each measurement azimuth at the at least particular depth as the azimuth of the contacting point between the corresponding measuring finger and the tubular.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus comprising:
 a tool string for use in a tubular extending into a subterranean formation, wherein the tool string comprises a plurality of modular components that includes:
  a first and a second caliper module each comprising a plurality of radially rotatable fingers for sensing an internal diameter of the tubular, wherein the fingers are distributed around the circumference of the tool string and wherein the fingers of the second caliper module are azimuthally offset relative to the fingers of the first caliper module, wherein the fingers comprise sensing fingers for gathering caliper data, wherein the caliper data comprises data acquired from each one of the sensing fingers;
  wherein the caliper modules comprise an actuator for actively extending and retracting the fingers of the caliper modules; and
  a power and control (P/C) module operable for distributing power and control signals to the first and second caliper modules;
  wherein the caliper and P/C modules each have an upper and a lower interface,
  wherein the lower interfaces of the caliper and P/C modules are identical,
  wherein the caliper and P/C modules are mechanically and electrically interconnectable via interconnection of the upper interface of the first caliper module and the lower interface of the P/C module, and
  wherein the first caliper module includes a first controller, the second caliper module includes a second controller, and the first and second controllers are electrically connected to a master board of the P/C module in parallel by a first signal connection and in series by a second signal connection.

2. The apparatus of claim 1 wherein:
 the plurality of modular components further includes one or more centralizer modules operable for centralizing the first and second caliper modules within the tubular;
 the P/C module is operable for distributing power and control signals to the one or more centralizer modules; and
 wherein each of the one or more centralizer modules has lower and upper interfaces,
 wherein the upper interfaces of at least the first and second caliper and the one or more centralizer modules are identical,
 wherein the lower interfaces of the one or more centralizer modules are identical to the lower interfaces of the first and second caliper modules and the P/C module,
 wherein the first and second caliper modules, the one or more centralizer modules, and the P/C module are mechanically and electrically interconnectable via interconnection of the upper interface of a first module with the lower interface of a second module, wherein the first and second modules are distinct modules and wherein the first module includes at least one of the first or second caliper modules or one of the one or more centralizer modules, and wherein the second module includes at least one of the first or second caliper modules, the P/C module or one of the one or more centralizer modules.

3. The apparatus of claim 1 wherein the tool string is configured for conveyance within the tubular via one of a plurality of different types of conveyance, and wherein the modular components are operable for use with each of the different types of conveyance.

4. The apparatus of claim 3 wherein the tool string further comprises:
 a logging head for connecting with one type of conveyance but not with at least one of other types of conveyance; and
 a telemetry module connected between the logging head and the P/C module, wherein the telemetry module is operable with the one type of conveyance but not with at least one of the other types of conveyance.

5. The apparatus of claim 4 wherein the tool string further comprises one adapter of a plurality of different adapters, wherein the different adapters are each for use with one of the different types of conveyance but not with at least one of other types of conveyance, and wherein the one adapter is connected between the telemetry module and the P/C module.

6. The apparatus of claim 1 wherein the azimuthally offset fingers distributed around the circumference of the tool string enable mapping of a measured section of the tubular by integrating different measuring points, each measuring point associated with a different one of the sensing fingers.

7. The apparatus of claim 1 wherein the lower interface of one of the first and second caliper modules is connected to an upper interface of the other of the first and second caliper modules.

8. The apparatus of claim 1 wherein the first and second caliper modules comprise one or more position sensors operable for determining depth and/or azimuth of the first and second caliper modules comprising the one or more position sensors.

9. The apparatus of claim 1 wherein the tool string further comprises an additional tool for performing an additional measurement, and wherein the P/C module is configured to command operation of the additional tool based on data obtained by the first and second caliper modules.

10. The apparatus of claim 1 wherein the P/C module is configured to command a change in an operating parameter of the apparatus based on data obtained by the first and second caliper modules.

11. The apparatus of claim 1, wherein the caliper data gathered by each of the sensing fingers is received by a data acquisition device on the corresponding first or second caliper modules.

12. The apparatus of claim 1, wherein the P/C module is configured to send control signals to the first and second caliper modules to extend or retract the fingers of the first and second caliper modules.

13. A method comprising:
running a tool string to a target depth in a borehole, wherein the tool string comprises a power and control (P/C) module, a first multi-finger caliper (MFC) module, and a second MFC module, wherein the first MFC module comprises a plurality of sensing fingers and wherein the sensing fingers are in a retracted position when running to the target depth;
extending the plurality of sensing fingers of the first MFC module from the retracted position to an extended position, wherein each of the sensing fingers are configured to gather caliper data and transmit the caliper data to a block of sensors on the first MFC module; and
logging with standard parameters until a defect is detected via operation of the first MFC module at a first resolution, and then logging a zone of interest containing the defect via operation of the second MFC module at a second resolution greater than the first resolution,
wherein the sensing fingers of the first MFC module are distributed around the circumference of the tool string, thereby enabling mapping of a measured section of the borehole by integrating different measuring points in the caliper data associated with each of the sensing fingers, and
wherein the first MFC module includes a first controller, the second MFC module includes a second controller, and the first and second controllers are electrically connected to a master board of the P/C module in parallel by a first signal connection and in series by a second signal connection.

14. The method of claim 13 wherein:
logging the zone of interest comprises logging with refined parameters; and
the refined parameters include a lower logging speed than of the standard parameters.

15. The method of claim 14 wherein sensing fingers of the second MFC module are distributed around the circumference of the tool string and azimuthally offset from the sensing fingers of the first MFC module, and wherein logging the zone of interest comprises logging with each of the first and second MFC modules, which permits logging the zone of interest at the second resolution.

16. The method of claim 14, wherein the caliper data gathered by each of the sensing fingers is received by the block of sensors and transmitted to a data acquisition device on the first MFC module.

17. The method of claim 14, wherein the first MFC module comprises an actuator configured to actively extend and retract the plurality of sensing fingers of the first MFC module and wherein extending comprises engaging the actuator to extend the sensing fingers to the extended position.

18. The method of claim 14, further comprising retracting the sensing fingers of the first MFC module when logging is completed.

19. The method of claim 13 wherein the tool string further comprises an ultrasonic tool or an electromagnetic tool.

* * * * *